United States Patent [19]

Matsuda et al.

[11] Patent Number: 4,561,746
[45] Date of Patent: Dec. 31, 1985

[54] FOCUS DETECTION DEVICE AND AUTOMATIC FOCUSING DEVICE FOR CAMERA

[75] Inventors: Motonobu Matsuda; Masatoshi Ito, both of Sakai, Japan

[73] Assignee: Minolta Camera Kabushiki Kaisha, Osaka, Japan

[21] Appl. No.: 619,882

[22] Filed: Jun. 12, 1984

[30] Foreign Application Priority Data

Jun. 15, 1983 [JP] Japan .................................. 58-108395

[51] Int. Cl.[4] ............................................... G03B 3/00
[52] U.S. Cl. .................................... 354/400; 354/403
[58] Field of Search ................................ 354/400–409, 354/195.1; 352/140

[56] References Cited

U.S. PATENT DOCUMENTS

| | | | |
|---|---|---|---|
| 4,305,657 | 12/1981 | Masunaga et al. | 356/1 |
| 4,432,620 | 2/1984 | Kurokawa | 354/402 |
| 4,470,683 | 9/1984 | Nakajima | 354/406 |

FOREIGN PATENT DOCUMENTS

| | | |
|---|---|---|
| 45-40124 | 12/1970 | Japan . |
| 55-111925 | 8/1980 | Japan . |
| 56-147299 | 11/1981 | Japan . |
| 190936 | 11/1982 | Japan ................................. 354/409 |

*Primary Examiner*—William B. Perkey
*Attorney, Agent, or Firm*—Wolder, Gross & Yavner

[57] ABSTRACT

The disclosure is directed to a focus detection device which is provided with first to third reference signal generators for generating reference signals which are compared with a focus condition signal varying with the amount and direction of the adjustment required for the objective lens to focus on a target object, and also, to an automatic focusing device for a camera, which is equipped with an objective lens operating system for the focusing, and a motor for controlling the objective lens operating system in response to a signal from a focus condition determining means.

22 Claims, 4 Drawing Figures

FOCUS DETECTION DEVICE AND AUTOMATIC FOCUSING DEVICE FOR CAMERA

BACKGROUND OF THE INVENTION

1. Technical Field

The present invention relates to a focus detection device and an automatic focusing device for a camera.

2. Prior Art

Conventionally, an automatic-focusing camera of the kind as referred to above, is so arranged that an in-focus level is set to indicate that the objective lens is in an in-focus position with respect to the target object or an object to be photographed, while, through detection of the camera-to-object distance or the defocus state of an object image formed by an objective lens, with a range finding means or focus detecting means constituted by photosensitive elements, etc., the level of the detection signal for the camera-to-object distance or the defocus state of the object image is adapted to be relatively shifted in level with respect to the in-focus level, following the adjusting operation of the objective lens so that the objective lens is stopped when the detection signal has reached the in-focus level.

In the known arrangement as described above, however, there has been such a disadvantage that since detection signals from a distance measuring means or focus condition detecting means tend to be subjected to level variations consequent to disturbances or noise internally generated in the circuits, even after the objective lens has been stopped at the in-focus position, if the level of the detected signal is deviates from the in-focus level referred to earlier by such level variations, the objective lens resumes the reciprocating movement therewith, thus resulting in the inconvenience that the lens can not readily be stabilized at the predetermined in-focus position.

SUMMARY OF THE INVENTION

Accordingly, a primary object of the present invention is to provide an improved focus detection device and an automatic focusing device for a camera, which is capable of suppressing the hunting by the camera lens, consequent to level variations of detection signals resulting from external noises and noises within circuits, etc. for stably maintaining the in-focus condition.

In accomplishing the above object and other objects, according to one preferred embodiment of the present invention, there is provided a focus detection device including a reference signal generating means for generating first to third reference signals which are to be compared with a focus condition signals from a focus condition signal generating means which varies with the amount and direction of the adjustment required for an objective lens to focus on a target object or an object to be photographed. The first reference signal is larger than the third reference signal by a predetermined value, and the second reference signal is smaller than the third reference signal by a predetermined value. The focus detection device according to the present invention further includes a focus condition determining means switchable between a first operation mode for comparing the focus condition signal with the third reference signal and a second operation mode for comparing the focus condition signal with the first and second reference signals, and a switching means for switching over the operation modes of said focus condition determining means. The focus condition determining means is arranged to determine that the objective lens is in an in-focus condition with respect to the target object or the object to be photographed when the focus condition signal reaches the third reference signal in the first operation mode, and when the focus condition signal remains within the range between the first and second reference signals in the second operation mode, respectively. In the above determination, the in-focus signal is provided by the focus condition determining means. On the other hand, the focus condition determining means produces an out-of-focus signal, when the focus condition signal does not reach the third reference signal in the first operation mode, or when the focus condition signal goes out of the range between the first and second reference signals in the second operation mode so as to determine that the objective lens is in the out-of-focus state with respect to the target object or the object to be photographed. Meanwhile, the switching means changes over the the focus condition determining means from the first operation mode to the second operation mode when said focus condition determining means has produced the in-focus signal in the first operation mode, i.e. upon determination that the objective lens is in the in-focus condition with respect to the target object or the object to be photographed.

The automatic focusing camera according to the present invention includes, in addition to the focus detection device having the construction as described so far, an objective lens drive means for driving the objective lens for the focusing adjustment, and a drive control means for causing the objective lens drive means to drive the objective lens in response to the out-of-focus signal from the focus condition determining means and to stop the driving of the objective lens in response to the in-focus signal from the focus condition determining means.

In the focus detection device according to the present invention, once the objective lens has been adjusted to be in the in-focus condition with respect to the target object or the object to be photographed, the focus condition determining means is changed over to the second operation mode, so that the range to be regarded as in the in-focus condition is expanded, and therefore, there is no possibility that the in-focus condition is erroneously determined to be the out-of-focus condition consequent to the influences of external noises and noises within the device, etc. Moreover, in the automatic focusing camera of the present invention employing the focus detection device as described so far, it is possible to suppress the tendency that the objective lens is subjected to hunting even after having reached the in-focus condition due to the influence of external noises and noises within the device, and thus, the objective lens can be stably maintained in the in-focus state.

These and other objects and features of the present invention will be further clarified from the following description of preferred embodiments given with reference to the accompanying drawings.

DESCRIPTION OF PREFERRED EMBODIMENTS

Referring now to the drawings, one preferred embodiments according to the present invention will be described hereinbelow with particular reference to FIGS. 1 and 2, in which an objective lens is adapted to be driven, or at least one or more of the lens elements constituting the objective lens, forwardly or rearwardly for focusing in the direction of the optical axis thereof by a lens driving mechanism 2. A first reference voltage supply circuit 3 produces through change-over, a high level voltage $V_H$ adapted to correspond to an upper limit value of the in-focus zone providing an allowable range for the lens position which may be regarded as in the in-focus condition with respect to the object to be photographed, and an intermediate voltage $V_C$ which is lower than the high level voltage $V_H$ by a predetermined level (equivalent to ½ width of the in-focus zone) as a reference voltage.

A second reference voltage supply circuit 4 which constitutes a reference voltage generating means together with the above first reference voltage supply circuit 3 is arranged to produce, through change-over, a low level voltage $V_L$ adapted to correspond to a lower limit value of the in-focus zone, and the intermediate voltage $V_C$ which is higher than the low level voltage $V_L$ by a predetermined level (equivalent to ½ width of the in-focus zone) as a reference voltage.

A focus condition signal generating means 5 generates a signal voltage which varies with the amount and direction of the adjustment required for the objective lens 1 to focus on the target object, while an analogue memory circuit 6 stores the above signal voltage, which is applied to an inverting input terminal of an upper limit comparison circuit 7 and to a non-inverting input terminal of a lower limit comparison circuit 8. The comparison circuit 7 compares the signal voltage produced from the analogue memory circuit 6 with the reference voltage of the reference voltage supply circuit 3, and produces a signal of low level from the non-inverting output terminal, and a signal of high level from the inverting output terminal when the signal voltage exceeds the reference voltage. The lower limit comparison circuit 8 compares the signal voltage produced from the memory ciruict 6 with the reference voltage of the reference voltage supply circuit 4, and produces a low level signal from the inverting output terminal when the signal voltage is lower than the reference voltage.

A first switching means 9 designates the intermediate voltage $V_C$ as the reference voltage of the reference voltage supply circuit 3 when the comparison circuit 7 produces a high level signal from the inverting output, and designates the high level signal $V_H$ when it produces a low level signal form the inverting output.

Meanwhile, a second switching means 10 designates the intermediate voltage $V_C$ as the reference voltage of the reference voltage supply circuit 4 when the comparison circuit 8 outputs a low level signal from the non-inverting output terminal, and designates the low level voltage $V_L$ when it outputs a high level signal thereform. There is provided a drive control circuit 11 for controlling driving of a motor 12, and this cirucit 11 controls the driving of the motor by receiving signals from the non-inverting output terminals of the comparison circuits 7 and 8.

The objective lens driving mechansim 2 is constituted by the motor 12 and a geared focusing ring 13, etc., and it is so arranged that a drive gear 14 secured to a drive shaft of the motor 12 is engaged with the geared focusing ring 13 of the objective lens 1 so as to rotate the focusing ring 13 as the motor 12 is driven. Meanwhile, between the focusing ring 13 and a stationary barrel of the objective lens 1, there are formed helicoid threads (not particularly shown) so that the objective lens 1 is reciprocated for displacement following rotation of the focusing ring 13.

The reference voltage supply circuits 3 and 4 are provided with resistors R1 to R4 which are connected in series between a terminal A applied with the high level voltage and another terminal E applied with the low level voltage. To a terminal C' derived from an intermediate junction C of the above series circuit, the intermediate voltage VC between the high level voltage and the low level voltage is impressed. Between the terminal A and the resistor R1, a transistor Tr1 is connected for constituting the first switching means. The first reference voltage supply circuit 3 outputs a voltage which appears at a junction B when the transistor Tr1 is on, as the high level voltage $V_H$, and produces the intermediate voltage $V_C$ at the terminal C' from the junction B when said transistor Tr1 is in the off state. Moreover, between the terminal E and the resistor R4, there is connected a transistor Tr2. The second reference voltage supply circuit 4 produces a voltage appearing at a junction D when the transistor Tr2 is on, as the low level voltage $V_L$, and outputs the intermediate voltage $V_C$ of the terminal C' from the junction D when the transistor Tr2 is in the off state.

The focus condition signal generating means 5 includes an infrared LED 15 which projects infrared rays towards a target object, and a light receiving section 17 which receives the infrared rays reflected from the target object through a lens 16. The light receiving section 17 includes two sets of photosensitive elements 18 and 19 which are disposed side by side in a direction of rocking at a front end portion of a connecting lever 21 which is pivotally supported by a pin 20 for pivotal movement in a widthwise direction of a camera body (not particularly shown). A follower pin 22 provided on a branched piece 21a of the connecting lever 21 is engaged with a cam surface 13a formed by cutting on an end face of the focusing ring 13 at the side of the camera body so that the branched piece 21a is pivoted in reciprocating directions indicated by arrows P1 as the focusing ring 13 is rotated, with a consequent lateral movement of the light receiving section 17 in directions indicated by arrows P2. Since the reflecting angle of infrared rays by a target object is increased or decreased according to the camera-to-object distances, the amount of light received by the photosensitive element 18 located at a distant position from the infrared LED 15 is increased, as compared with that of the photosensitive element 19 located at a position close thereto, as the camera-to-object distance is reduced, while on the contrary, the amount of light received by the photosensitive element 19 located close to the infrared LED 15 is increased as the camera-to-object distance is increased. The angle for the rocking motion of the light receiving section 17 and the extended position of the objective lens 1 are so related that, when the light receiving section 17 is displaced to a rocking position where the light receiving amounts of the two sets of photosensitive elements 18 and 19 become equal with respect to any desired target object, the objective lens 1 has moved to an extended position where it is in the in-focus condition with respect to the target object.

At the subsequent stages of the respective photosensitive elements 18 and 19, there are provided amplification circuits 23 and 24, logarithmic compression circuits 25 and 26, and an output differential amplification circuit 27, so that the photo-electric conversion outputs derived from the photosensitive elements are respectively amplified by the amplification circuits 23 and 24, and thereafter, subjected to level conversion by the logarithmic compression circuits 25 and 26, while the two level conversion outputs are applied to the output differential amplification circuit 27 so as to produce a voltage signal at a level corresponding to the ratio of the respective light receiving amounts of the photosensitive elements 18 and 19.

In the signal voltage generating means 5, there is provided a pulsating current detection circuit 28. In the case where a target object is illuminated, for example, by a light source energized by A.C. current as in a fluorescent lamp, light incident upon the light receiving section 17 contains a ripple component resulting from the A.C. energization of the illuminating light source, and therefore, such pulsation is detected by the above pulsating current detection circuit 28. By controlling an LED drive circuit 29 with this detection output so as to illuminate and drive the infrared LED 15 in synchronization with rising of pulsation in the illuminating light source, such pulsation is prevented from affecting the light receiving amount. A timer circuit 30 is connected to the LED drive circuit 29 for controlling the illumination repetition time of the infrared LED 15. A memory circuit 6 is provided to maintain the signal voltage during the energization of the infrared LED, even when the infrared LED is de-energized.

The first switching means 9 includes the transistor Tr1 and a bias circuit which applies the inverted output of the upper limit comparison circuit 7 to the base of the transistor Tr1 through a resistor R5. Meanwhile, the second switching means 10 is constituted by the transistor Tr2, and a bias circuit which impresses the non-inverted output of the lower limit comparison circuit 8 to the base of the transistor Tr2 through a resistor R6.

The operation of the automatic focusing device for the camera employing this focus detection device will be described hereinbelow.

It is assumed here that, in the initial state, the objective lens 1 is positioned at an extended position which provides the in-focus condition with respect to a target object located, for example, at an intermediate position between the infinite distance and the closest or shortest distance. Accordingly, the light receiving section 17 is at such a rocked position that the light receiving amounts of the two sets of photosensitive elements 18 and 19 are equal to each other with respect to the target object located at the intermediate distance, and the light receiving amount of the photosensitive element 18 is large with respect to a target object located at a relatively short distance, while on the contrary, the light receiving amount of the photosensitive element 19 is increased with respect to a target object located at a relatively long distance.

In the above case, if the target object is located at the long distance side, the light receiving amount of the photosensitive element 19 is greater than with that of the photosensitive element 18 in the light receiving section 17, and therefore, the output level of the output differential amplification circuit 27 is sufficiently larger than in the case where the light receiving amounts of the photosensitive elements 18 and 19 are equal to each other (at this time, the output level becomes an intermediate level of the in-focus zone, i.e. the intermediate voltage $V_C$), and exceeds the high level voltage $V_H$ giving the upper limit value of the in-focus zone. The signal voltage output from this output differential amplification circuit 27 is once stored in the analogue memory circuit 6, and therefore, is received respectively through the inverted input terminal of the upper limit comparison circuit 7 and the non-inverted input terminal of the lower limit comparison circuit 8.

The non-inverted output terminals of the upper limit comparison circuit 7 and the lower limit comparison circuit 8 are connected to the power source $V_{CC}$ respectively through resistors R7 and R8, and immediately after turning on of the power supply, the respective comparison circuits 7 and 8 are stabilized in the state for outputting H signals (high voltage signals) from the non-inverted output terminals. Accordingly, in the first switching means 9 at this time, the base potential of the transistor Tr1 is lowered by the L signal (low voltage signal) which is the inverted output terminal signal of the comparison circuit 7, and the transistor Tr1 is in the on state. Therefore, in the upper limit comparison circuit 7, the high level voltage $V_H$ which is the divided voltage at the junction B is received as the comparison voltage. As described earlier, since the voltage output from the memory circuit 6 exceeds the above high level voltage $V_H$, the non-inverted output and the inverted output of the upper limit comparison circuit 7 are instantaneously inverted respectively to the L signal and H signal after turning on of the power supply. Upon receipt of these signals, in the switching means 9, the base potential of the transistor Tr1 is raised to turn the transistor Tr1 into the off state, and therefore, the reference voltage taken out from the junction B is changed into the intermediate voltage $V_C$ impressed from the terminal C'. At this time, the non-inverted output of the lower limit comparison circuit 8 is of a high signal, and by receiving this output and the L signal non-inverted output of the upper limit comparison circuit 7, the drive control circuit 11 drives the motor 12 in the direction in which the objective lens 1 is moved by the lens drive mechanism 2 to focus on the distant position.

Figure 1:
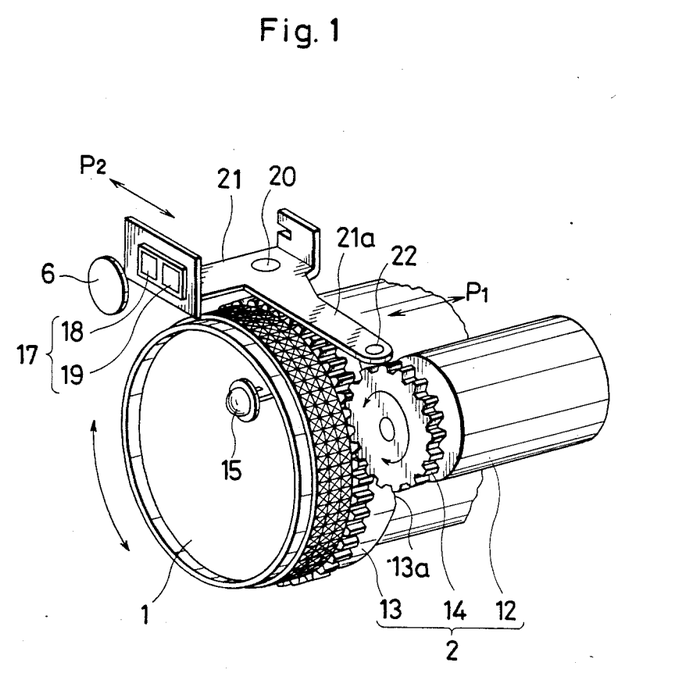
FIG. 1 is a fragmentary perspective view of an objective lens, lens focussing motor and focus sensing elements employed in the preferred embodiment of the present invention.
Figure 2:
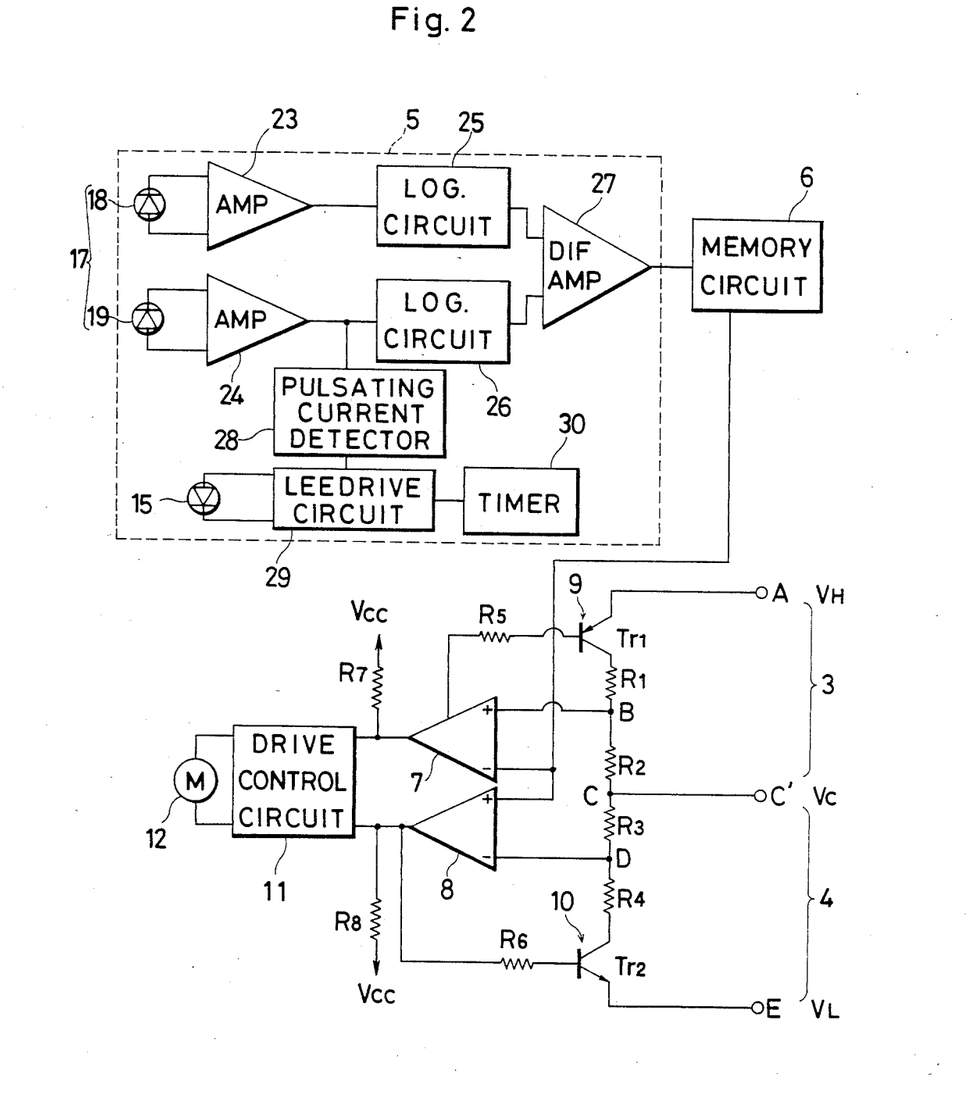
FIG. 2 is a circuit diagram of the control network thereof.

Consequent to the objective lens drive, the follower pin 22 is moved by the cam surface 13a of the focusing ring 13, and the branched piece 21a of the connecting lever 21 is pivoted in the directions indicated by the arrows P1 in FIG. 1, with the consequent displacement of the light receiving section 17 in the directions indicated by the arrows P2. As such displacement proceeds, the light receiving amount of the photosensitive element 18 is gradually decreased, while that of the photosensitive element 19 is increased. Accordingly, the difference in the light receiving amounts between the photosensitive elements 18 and 19 diminishes, and thus, the signal voltage output from the memory circuit is gradually lowered. In this case also, the lower limit comparison circuit 8 continues to output the H signal similar to that immediately after turning on of the power supply from the non-inverted output terminal. Therefore, the low level voltage $V_L$ is maintained as the reference voltage imparted to the lower limit comparison circuit 8. Even when the level lowering has proceeded until the signal voltage produced from the memory circuit 6 falls below the high level voltage $V_H$, since the reference voltage to be given to the upper limit comparison circuit 7 has already been converted into the intermediate voltage $V_C$, this comparison circuit 7 still continues to produce the L signal output from the non-inverting output terminal. Moreover, the non-inverted inverted output of the lower limit comparison circuit 8 is maintained at the high level. Accordingly, the lens drive mechanism 2 continues to function, and the signal voltage from the memory circuit 6 still continues to be lowered.

When the signal voltage from the memory circuit 6 has been lowered to such an extent that it goes below the intermediate voltage $V_C$, the non-inverted terminal output of the upper limit comparison circuit 7 is inverted to the H signal from the L signal, while the inverted terminal output thereof is inverted to the L signal from the H signal. Then, in the switching means 9, the transistor Tr1 is lowered in the base potential thereof, and is inverted to the on state from the off state. Accordingly, the reference voltage input to the comparison circuit 7 returns to the initial high level voltage $V_H$ from the intermediate voltage $V_C$. More specifically, when the signal voltage from the memory circuit 6 has been lowered down to the level of the intermediate voltage $V_C$ which is equivalent to the in-focus position, the upper limit value of the in-focus zone is restored to the original level. Meanwhile, upon receipt of the inversion of the non-inverted terminal output of the upper limit comparison circuit 7 to the H signal, the drive control circuit 11 causes the motor 12 to stop. It is to be noted here that, at this time, the non-inverted terminal output of the lower limit comparison circuit 8 is maintained at the H signal. Accordingly, the objective lens 1 is set at the extended position where it is in the in-focus condition with respect to the target object at that time. By this, the signal voltage from the memory circuit 6 is set at approximately the intermediate position of the in-focus zone, and thus, a noise margin equivalent approximately to ½ width of the in-focus zone is provided with respect to the external noises and noises within the circuit so as to make it possible to stably maintain the objective lens 1 at the in-focus position.

Although the foregoing description relates to the focusing operation in the case where the objective lens 1 is positioned to the deviated towards the short distance photographing side from the in-focus position, with respect to the target object, the focusing operation in the case where the signal voltage from the memory circuit 6 is in the level falling below the low level voltage $V_L$, with the objective lens being, on the contrary, deviated towards the long distance photographing side beyond the in-focus position, is effected as follows generally in the same manner as above.

In this case, the non-inverted terminal output of the lower limit comparison circuit 8 becomes the L signal, and the non-inverted terminal output of the upper limit comparison circuit 7 becomes the H signal. Accordingly, the drive control circuit 11 drives the motor 12 so as to displace the objective lens 1 towards the short distance photographing side, while the reference voltage input to the comparison circuit 8 changes from the low level voltage $V_L$ to the intermediate voltage $V_C$. Thereafter, upon rising of the level up to such a point where the signal voltage from the memory circuit 6 exceeds the intermediate voltage $V_C$, the non-inverted terminal output of the comparison circuit 8 is inverted to the H signal, and the reference voltage input to this comparison circuit 8 returns from the intermediate voltage $V_C$ back to the original low level voltage $V_L$. The objective lens 1 is stopped by the inversion of the non-inverted output of the comparison circuit 8 to the H signal, and is set at the in-focus position. During the period, the non-inverted output of the comparison circuit 7 maintains the H signal, while the inverting output thereof remains the L signal. Therefore, the reference voltage input to the comparison circuit 7 is maintained at $V_H$.

In the case where the signal voltage from the memory circuit 6 is already within the in-focus zone, i.e. at the level between the high level voltage $V_H$ and the low level voltage $V_L$ upon turning on of the power source, the non-inverted terminal outputs of both the comparison circuits 7 and 8 become the H signals, and therefore, the objective lens 1 remains in the position it is. Accordingly, even if the signal voltage from the memory circuit 6 is deviated to a certain extent above or below the intermediate voltage $V_C$, no focusing operation is effected any further. As at this time the objective lens 1 is not always located at the intermediate position of the in-focus zone, the noise margins up to the upper and lower limits of the in-focus zone may differ from one another. However, in such a state as above, under the influence of noises, if the signal voltage from the memory circuit 6 deviates, for example, from the limit side of the in-focus zone with a small noise margin, the objective lens can thereafter be positively set at the intermediate position of the in-focus zone by the previous focusing function, and thus, there is no possibility that the objective lens 1 undesirably repeats the hunting for a long time.

As is clear from the foregoing description, when the non-inverted outputs of the comparison circuits 7 and 8 are both of the H signals, they form the in-focus signal. On the other hand, if the non-inverted outputs of the comparison circuits 7 and 8 are respectively of the H signal and L signal, or of the L signal and H signal, they form the out-of-focus signal.

Figure 3:
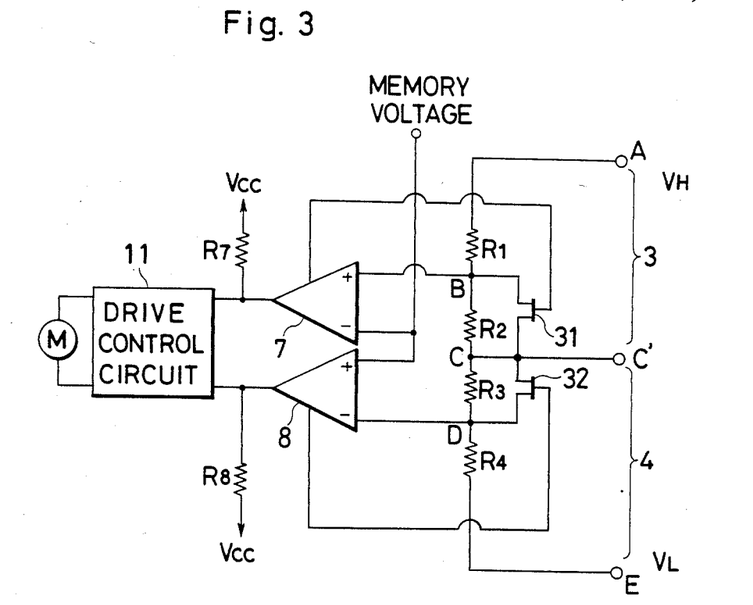
FIG. 3 is a view similar to FIG. 2 of another embodiment of the present invention.

Reference is now made to FIG. 3 in which a second embodiment according to the present invention is shown.

In this embodiment, as the switching means for switching and controlling the reference voltages, field effect transistors FET 31 and 32 are employed so as to bridge terminals of the resistor R2 by the field effect transistor FET 31, and terminals of the resistor R3 by the field effect transistor FET32 respectively. When the non-inverted output terminal outputs of the respective comparison circuits 7 and 8 have become the L signals, the H signals which are then inverted output terminal outputs thereof are respectively applied to the gates of the corresponding field effect transistor FET 31 and FET 32 for shortcircuiting the terminals of each of the resistors R2 and R3. For example, in the case where the signal voltage produced from the memory circuit 6 exceeds the high level voltage $V_H$, the comparison circuit 7 outputs the L signal from its non-inverted terminal, and therefore, the H signal which is the inverting output terminal output is applied to the gate of field effect transistor FET 31, with the field effect transistor FET 31 being turned on, and the reference voltage obtained from the junction B becomes approximately equal to the intermediate voltage $V_C$ applied to the terminal C'. When the signal voltage from the memory circuit 6 is lowered so as to fall below the intermediate voltage $V_C$, the output of the non-inverted output terminal of the comparison circuit 7 is inverted to be changed into the H signal, with the objective lens 1 being stopped, while the inverted output terminal output of the comparison circuit 7 becomes the L signal, and the gate potential of the field effect transistor FET 31 is lowered and the transistor FET 31 is turned into the off state, so that the high level signal $V_H$ which is the divided voltage at the junction B is taken out as the reference voltage.

In the case where the signal voltage from the memory circuit 6 rises from the level below the low level voltage $V_L$, the reference voltage applied to the lower limit comparison circuit 8 is switched from the intermediate voltage $V_C$ to the low level voltage $V_L$ by the on/off functions of the field effect transistor FET 32.

Since the other components are generally similar to those in the previous embodiment, additional description of the second embodiment is omitted here for brevity of explanation.

Figure 4:
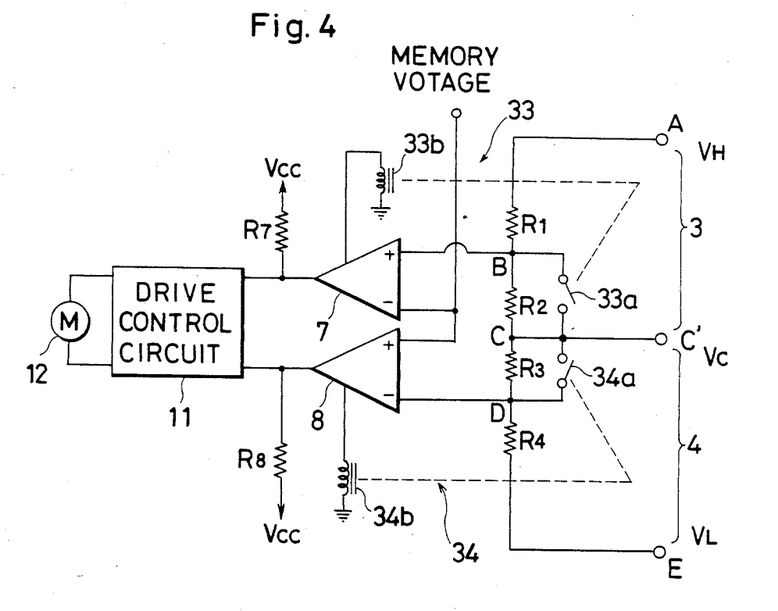
FIG. 4 is a view similar to FIG. 2 of still another embodiment of the present invention.

Referring further to FIG. 4, there is shown a third embodiment according to the present invention.

In this embodiment, as the switching means for switching and controlling the reference voltage, relays 33 and 34 are employed, and the terminals of the resistor R2 are bridged by the contacts 33a of the relay 33, while those of the resistor R3 are bridged by the contacts 34a of the relay 34 respectively. Thus, when the non-inverted output terminal outputs of the respective comparison circuits 7 and 8 have become the L signals, and the inverted output terminal outputs thereof have been turned into the H signals, coils 33b and 34b of the respective relays 33 and 34 are excited by the H signals which are the inverted output terminal outputs the comparison circuits 7 and 8 so as to close the respective contacts 33a and 34a for shortcircuiting the terminals of the respective resistors R2 and R3. Since the functions thereof are generally similar to those in the previous embodiment in which the field effect transistors FET are employed, and other constructions are the same as those in the first embodiment described earlier, a detailed description of this third embodiment is omitted here for simplification of the explanation.

Although the embodiments of the present invention have been described in detail so far with reference to the accompanying drawings, it should be noted that the present invention is not limited in its application only to the foregoing embodiments, but may be modified in various ways within the scope the appended claims. For example, in the case where the light emitting element 15 is not required to be intermittently driven, the memory circuit 6 is unnecessary even in the circuit of FIG. 2.

What is claimed is:

1. A focus detection device comprising:
   an objective lens adjustable for focusing;
   a focus condition signal generating means for generating a focus condition signal which varies with the amount and direction of the adjustment required for said objective lens to focus on a target object;
   a reference signal generating means for generating first to third reference signals, said first and second reference signals being larger and smaller than said third reference signal by a predetermined value, respectively;
   a focus condition determining means switchable between a first operation mode for comparing said focus condition signal with said third reference signal and a second operation mode for comparing said focus condition signal with said first and second reference signals, said focus condition determining means being adapted to determine that said objective lens is in an in-focus condition with respect to the target object, with said focus condition signal reaching said third reference signal in said first operation mode, and with said focus condition signal remaining within the range between said first and second reference signals in said second operation mode, respectively; and
   a switching means for switching said focus condition determining means from said first operation mode to said second operation mode when said focus condition determining means in said first operation mode has determined that said objective lens is in an in-focus condition with respect to the target object.

2. A focus detection device as defined in claim 1 wherein said focus condition determining means includes a first comparator having first and second input terminals connected to receive said focus condition signal and said first and third reference signals respectively and a second comparator having first and second input terminals connected to receive said focus condition signal and said second and third reference signals.

3. A focus condition detection device as defined in claim 2, wherein said switching means includes a first switching element for causing said first and third reference signals to be selectively input to said second input terminal of said first comparator and a second switching element for causing said second and third reference signals to be selectively input to said second input terminal of said second comparator, said first switching element being responsive to an output of said first comparator generated with said focus condition signal reaching said third reference signal for causing said first reference signal to be input to said second input terminal of said first comparator, while said second switching element is responsive to an output of said second comparator generated with said focus condition signal reaching said third reference signal for causing said second reference signal to be input to said second input terminal of said second comparator.

4. A focus condition detection device as defined in claim 3 wherein said focus condition signal generating means is adapted to generate said focus condition signal as an analogue voltage signal, said reference signal generating means is adapted to generate said first to third reference signals as analogue voltage signals, and said first and second comparators are analogue voltage comparators.

5. A focus detection device as defined in claim 4 wherein said reference signal generating means includes first and second impedance elements for providing the predetermined level difference between said first and third reference signals and between said second and third reference signals, respectively.

6. A focus detection device as defined in claim 5 wherein said first switching element is arranged to selectively make said first impedance element effective and in-effective, and said second switching element is arranged to selectively make said second impedance element effective and in-effective.

7. A focus detection device as defined in claim 6 wherein said first and second impedance elements are resistors.

8. A focus detection device as defined in claim 1 wherein said focus condition signal generating means includes a light emitting element for emitting a light towards the target object, first and second photosensitive means supported at a position spaced from said light emitting element by a given distance to be angularly displaceable and to receive said light reflected at the target object respectively for generating outputs which vary with the distance between the target object and said device and the angular position of said photosensitive means, a control means for angularly displacing said first and second photosensitive means in accordance with the adjusted position of said objective lens and for means processing said outputs of said first and second photosensitive means to produce said focus condition signal.

9. An automatic-focusing device for a camera comprising:
- an objective lens adjustable for focusing;
- a focus condition signal generating means for generating a focus condition signal which varies with the amount and direction of the adjustment required for said objective lens to focus on an object to be photographed;
- a reference signal generating means for generating first to third reference signals, said first reference signal and said second reference signal being larger and smaller than said third reference signal by a predetermined value, respectively;
- a focus condition determining means switchable between a first operation mode for comparing said focus condition signal with said third reference signal and a second operation mode for comparing said focus condition signal with said first and second reference signals, said focus condition determining means in said first operation mode generating an in-focus signal representing that said objective lens is in an in-focus condition with respect to the object to be photographed, with said focus condition signal reaching said third reference signal and an out-of-focus signal representing that said objective lens is in an out-of-focus condition without said focus condition signal reaching said third reference signal, whereas said focus condition determining means in said second operation mode continues to generate said in-focus condition signal unless said focus condition signal goes out of the range between said first and second reference signals;
- an objective lens drive means for driving said objective lens for the adjustment thereof; a drive control means for causing said objective lens drive means to drive said objective lens in response to said out-of-focus signal and to stop the driving in response to said in-focus signal; and
- a switching means for switching said focus condition determining means from said first operation mode to said second operation mode in response to said in-focus signal.

10. An automatic-focusing device for a camera as defined in claim 9, wherein said focus condition signal is larger than said first reference signal when the adjustment in one direction is required for said objective lens to focus on the object to be photographed and said focus condition signal is smaller than said second reference signal when the adjustment in an opposite direction is required for said objective lens to focus on the object to be photographed.

11. An automatic-focusing device for a camera as defined in claim 10, wherein said out-of-focus signal represents the direction of adjustment required for said objective lens to focus on the object to be photographed, depending on whether said focus condition signal is larger than said third reference signal when said focus condition determining means is in said first operation mode and depending on whether said focus condition signal is larger than said first reference signal or smaller than said second reference signal when said focus condition determining means is in said second operation mode respectively.

12. An automatic-focusing device for a camera as defined in claim 11 wherein said focus condition determining means includes a first comparator having first and second input terminals connected to receive said focus condition signal and said first and third reference signals respectively and a second comparator having first and second input terminals connected to receive said focus condition signal and said second and third reference signals.

13. An automatic-focusing device for a camera as defined in claim 12, wherein said switching means includes a first switching element for causing said first and third reference signals to be selectively input to said second input terminal of said first comparator and a second switching element for causing said second and third reference signals to be selectively input to said second input terminal of said second comparator, said first switching element being responsive to an output of said first comparator generated with said focus condition signal reaching said third reference signal for causing said first reference signal to be input to said second input terminal of said first comparator, while said second switching element is responsive to an output of said second comparator generated with said focus condition signal reaching said third reference signal for causing said second reference signal to be input to said second input terminal of said second comparator.

14. An automatic-focusing device for a camera as defined in claim 13 wherein said focus condition signal generating means is adapted to generate said focus condition signal as an analogue voltage signal, said reference signal generating means is adapted to generate said first to third reference signals as analogue voltage signals and said first and second comparators are analogue voltage comparators.

15. An automatic-focusing device for a camera as defined in claim 14 wherein said reference signal generating means includes first and second impedance elements for providing a predetermined level difference between said first and third reference signals and between said second and third reference signals, respectively.

16. An automatic-focusing device for a camera as defined in claim 15 wherein said first switching element is arranged to selectively make said first impedance element effective and in-effective and said second switching element is arranged to selectively make said second impedance element effective and in-effective.

17. An automatic-focusing device for a camera as defined in claim 16 wherein said first and second impedance elements are resistors.

18. An automatic-focusing device for a camera as defined in claim 9 wherein said focus condition signal generating means includes a light emitting element for emitting a light towards the obejct to be photographed, first and second photosensitive means supported at a position spaced from said light emitting element by a given distance to be angularly displaceable and to receive said light reflected at the object to be photographed respectively for generating outputs which vary with the distance between the object to be photographed and said device and the angular position of said photosensitive means, a control means for angularly displacing said first and second photosensitive means in accordance with the adjusted position of said objective lens and for means processing said outputs of said first and second photosensitive means to produce said focus condition signal.

19. A focus detection device comprising:
an objective lens adjustable for focusing;
a focus condition signal generating means for generating a focus condition signal which is in the form of an analogue voltage and which varies with the amount and direction of the adjustment required for said objective lens to focus on a target object;
a reference signal generating means for generating first to third reference signals which are each respectively in the form of an analogue voltage, said first and second reference signals being larger and smaller than said third reference signal by a predtermined value, respectively;
a first comparator selectively settable to one of a first operation mode for comparing said focus condition signal with said third reference signal and a second operation mode for comparing said focus condition signal with said first reference signal and adapted to change its output depending on the comparison result in each of its first and second operation modes;
a second comparator selectively settable to one of a first operation mode for comparing said focus condition signal with said third reference signal and a second operation mode for comparing said focus condition signal with said second reference signal and adapted to change its output depending on the comparison result in each of its first and second operation modes, the combination of the outputs of said first and second comparators generated with at least one of said first and second comparators set to its first operation mode and with said focus condition signal reaching said third reference signal being an in-focus signal representing that said objective lens has been adjusted to an in-focus condition; and
a setting means for setting said first and second comparators to their second operation mode upon generation of said in-focus signal so that the generation of said in-focus signal continues until said focus condition signal goes out of the range between said first and second reference signals, while originally setting at least one of said first and second comparators to its first operation mode.

20. A focus condition detection device as defined in claim 19, wherein said setting means includes:
a first setting member for selectively setting said first comparator to one of its first and second operation modes, said first setting member setting said first comparator to its first operation mode when said focus condition signal is originally larger than said first reference signal while setting the same to its second operation mode when said focus condition signal decreases and reaches said third reference signal to change the output of said first comparator; and a second setting member for selectively setting said second comparator to one of its first and second operation modes, said second setting member setting said second comparator to its first operation mode when said focus condition signal is originally smaller than said second reference signal while setting the same to its second operation mode when said focus condition signal increases and reaches said third reference signal to change the output of said second comparator.

21. A focus condition detection device as defined in claim 20, wherein said first comparator includes a first input terminal connected to receive said focus condition signal and a second input terminal connected to receive said first and third reference signals, said second comparator includes a first input terminal connected to receive said focus condition signal and a second input terminal connected to receive said second and third reference signals, said first setting member includes a first switching element for causing said first reference signal, in place of said third reference signal, to be input to said second input terminal of said first comparator in response to the change of the output of said first comparator due to said focus condition signal reaching said third referene signal, and said second setting member includes a second switching element for causing said second reference signal, in place of said third reference signal, to be input to said second input terminal of said second comparator in response to the change of the output of said second comparator due to said focus condition signal reaching said third reference signal.

22. An automatic focusing device for a camera, comprising:
an objective lens adjustable for focusing;
an objective lens drive means for driving said objective lens for its adjustment for focusing;
a focus condition signal generating means for generating a focus condition signal which is in the form of an analogue voltage and which varies with the amount and direction of the adjustment required for said objective lens to focus on an object to be photographed;
a reference signal generating means for generating first to third reference signals which are each respectively in the form of an analogue voltage, said first and second reference signals being larger and smaller than said third reference signal by a predetermined value, respectively;
a first comparator selectively settable to one of a first operation mode for comparing said focus condition signal with said third reference signal and a second operation mode for comparing said focus condition signal with said first reference signal, and adapted to change its output depending on the comparison result in each of its first and second operation modes;
a second comparator selectively settable to one of a first operation mode for comparing said focus condition signal with said third reference signal and a second operation mode for comparing said focus condition signal with said second reference signal and adapted to change its output depending on the comparison result in each of its first and second operation modes, the combination of the outputs of said first and second comparators generated with at least one of said first and second comparators set to its first operation mode and with said focus condition signal reaching said third reference signal being an in-focus signal representing that said objective lens has been adjusted to an in-focus condition;

a setting means for setting said first and second comparators to their second operation mode upon generation of said in-focus signal so that the generation of said in-focus signal continues until said focus condition signal goes out of the range between said first and second reference signals, while originally setting at least one of said first and second comparator to its first operation mode; and a drive control means for causing said objective lens drive means to drive said objective lens in accordance with the outputs of said first and second comparators and to stop the driving in response to said in-focus signal.

* * * * *

UNITED STATES PATENT AND TRADEMARK OFFICE
CERTIFICATE OF CORRECTION

PATENT NO. : 4,561,746
DATED : Dec. 31, 1985
INVENTOR(S) : Motonobu Matsuda; Masatoshi Ito It is certified that error appears in the above–identified patent and that said Letters Patent are hereby corrected as shown below:

Title page:

Foreign Patent Document reference

"190936" should read --57-190936--.

Signed and Sealed this

Twentieth Day of May 1986

[SEAL]

Attest:

DONALD J. QUIGG

Attesting Officer

Commissioner of Patents and Trademarks